US010352676B2

(12) United States Patent
Gaines

(10) Patent No.: US 10,352,676 B2
(45) Date of Patent: Jul. 16, 2019

(54) SYSTEM AND METHOD FOR MAKING A FLUID CONTAINER WITH INTEGRATED AND LOCKING MEASURING TAPE

(71) Applicant: Magnolia IP Holdings, LLC, Woodway, TX (US)

(72) Inventor: Chip Gaines, Woodway, TX (US)

(73) Assignee: Magnolia IP Holdings, LLC, Woodway, TX (US)

( * ) Notice: Subject to any disclaimer, the term of this patent is extended or adjusted under 35 U.S.C. 154(b) by 163 days.

(21) Appl. No.: 15/480,225

(22) Filed: Apr. 5, 2017

(65) Prior Publication Data

US 2017/0284782 A1   Oct. 5, 2017

Related U.S. Application Data

(60) Provisional application No. 62/370,318, filed on Aug. 3, 2016, provisional application No. 62/318,501, filed on Apr. 5, 2016.

(51) Int. Cl.
| | |
|---|---|
| *G01B 3/10* | (2006.01) |
| *B65D 41/04* | (2006.01) |
| *B65D 51/18* | (2006.01) |
| *A45F 3/18* | (2006.01) |
| *A45F 3/16* | (2006.01) |
| *B65D 81/36* | (2006.01) |

(52) U.S. Cl.
CPC .............. *G01B 3/1041* (2013.01); *A45F 3/16* (2013.01); *A45F 3/18* (2013.01); *B65D 41/04* (2013.01); *B65D 51/18* (2013.01); *B65D 81/36* (2013.01); *G01B 3/1084* (2013.01); *B65D 2251/0015* (2013.01); *B65D 2251/0078* (2013.01); *G01B 2003/1043* (2013.01)

(58) Field of Classification Search
CPC .............................. G01B 3/1041; G01B 3/1084
USPC .............................................. 33/760; D10/72
See application file for complete search history.

(56) References Cited

U.S. PATENT DOCUMENTS

| | | |
|---|---|---|
| D26,510 S | 1/1897 | Wilcox |
| D47,355 S | 5/1915 | Coane |
| | (Continued) | |

FOREIGN PATENT DOCUMENTS

DE           3917124 A1 * 3/1990 ............... A01K 9/00

*Primary Examiner* — Christopher W Fulton
(74) *Attorney, Agent, or Firm* — Hemingway & Hansen, LLP; D. Scott Hemingway; Elizabeth Hartman

(57) ABSTRACT

The invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retracting measuring tape with a locking mechanism. The present invention allows for the simultaneous placement of a fluid container inside previously unused space in a measuring tape housing to store fluids in an efficient and effective manner without requiring two separate vessels or components, to allow for a more efficient and effective incorporation of a useful fluid vessel in previously unused space in a measuring tape mechanism to provide storage of hydration or medicinal fluids in a more efficient and effective manner on construction or work sites.

27 Claims, 8 Drawing Sheets

(56) References Cited

U.S. PATENT DOCUMENTS

| | | | |
|---|---|---|---|
| D49,292 S | 6/1916 | West | |
| 1,264,341 A * | 4/1918 | Slater | A63H 3/48 33/760 |
| D101,011 S | 8/1936 | Scurlock | |
| 2,230,668 A | 2/1941 | Ohrtmann | |
| D133,916 S | 9/1942 | Robinson | |
| 2,624,120 A | 1/1953 | Mills | |
| 2,651,843 A | 9/1953 | Goodford | |
| 2,842,853 A | 7/1958 | Hubbert | |
| 2,942,348 A | 6/1960 | Caruso | |
| 3,004,346 A | 10/1961 | Quenot | |
| 3,120,059 A | 2/1964 | Quenot | |
| 3,192,630 A | 7/1965 | Dineson | |
| D213,762 S | 4/1969 | Weckman | |
| 3,494,038 A | 2/1970 | Quenot | |
| 3,534,478 A | 10/1970 | Fisher | |
| 3,577,641 A | 5/1971 | Smith | |
| 3,731,389 A | 5/1973 | King | |
| 4,140,254 A | 2/1979 | Land | |
| 4,293,058 A | 10/1981 | Burton | |
| 4,438,538 A * | 3/1984 | Larsen | B25F 1/00 33/332 |
| 4,516,325 A * | 5/1985 | Cohen | G01B 3/1005 33/760 |
| 4,531,688 A | 7/1985 | Gall | |
| 4,760,648 A | 8/1988 | Doak et al. | |
| D329,326 S | 9/1992 | Sheehy et al. | |
| D332,913 S | 2/1993 | Carroll | |
| 5,379,524 A * | 1/1995 | Dawson | B25F 1/00 33/333 |
| 5,531,395 A * | 7/1996 | Hsu | B65H 75/44 242/381.6 |
| D407,320 S | 3/1999 | Costen et al. | |
| D408,623 S | 4/1999 | Shaanan et al. | |
| D418,369 S | 1/2000 | Bailey | |
| D422,227 S | 4/2000 | Lin | |
| 6,094,403 A * | 7/2000 | Tran | G01B 3/1084 33/760 |
| D431,480 S | 10/2000 | Walsten et al. | |
| D457,448 S | 5/2002 | Olson | |
| 6,434,854 B1 * | 8/2002 | MacColl | G01B 3/1084 33/668 |
| D466,824 S | 12/2002 | Kram | |
| 7,013,516 B1 * | 3/2006 | Peters | B25D 1/02 7/146 |
| D533,303 S | 12/2006 | Angeletta | |
| D533,459 S | 12/2006 | Wagner | |
| D546,692 S | 7/2007 | Verburg | |
| D569,097 S | 5/2008 | Leslie et al. | |
| D570,699 S | 6/2008 | Wagner | |
| 7,412,794 B2 * | 8/2008 | Smith | A01K 87/08 33/511 |
| D581,288 S | 11/2008 | Villalobos | |
| D649,063 S | 11/2011 | Bakalis | |
| D656,407 S | 3/2012 | Baussan | |
| D657,680 S | 4/2012 | Cora et al. | |
| D659,003 S | 5/2012 | Knox | |
| D678,780 S | 3/2013 | Macleod Jones | |
| 2006/0049066 A1 | 3/2006 | Wang | |
| 2007/0101600 A1 * | 5/2007 | Alders | G01B 3/1084 33/760 |
| 2007/0169365 A1 * | 7/2007 | Lin | B25B 15/00 33/760 |
| 2008/0086903 A1 * | 4/2008 | Peterson | G01B 3/1061 33/760 |
| 2008/0256816 A1 * | 10/2008 | Cosentino | B26B 5/001 33/760 |

\* cited by examiner

SYSTEM AND METHOD FOR MAKING A FLUID CONTAINER WITH INTEGRATED AND LOCKING MEASURING TAPE

RELATED APPLICATION DATA

This application is a continuation of Provisional Application No. 62/318,501, filed Apr. 5, 2016, and U.S. Provisional Application No. 62/370,318, filed Aug. 3, 2016. The Provisional Patent Applications are incorporated by reference into this utility patent application.

TECHNICAL FIELD

The present invention relates to a system and method for making a medicinal fluid container with integrated and locking measuring tape.

BACKGROUND OF THE INVENTION

The background of this invention will address measuring tapes, and separately, larger fluid containers. There is no indication that anyone has incorporated measuring tape mechanisms with medicinal fluid containers, or vice versa, that anyone has incorporated any type of fluid containers with any type of measuring tape mechanisms.

The goals of the present invention are not readily apparent from the prior art uses of measuring tapes, or separately, fluid containers; and, the synergies achieved by incorporation of the useful, but unused, space in a measuring tape mechanism, to hold and maintain fluids, particularly medicinal fluids for human consumption, is not readily apparent from the prior art. The goals achieved by the present invention are unrecognized, unrealized and not readily predictable as shown by a survey of the prior art measuring tape and fluid container art.

Measuring Tapes

A tape measure or measuring tape is a flexible ruler that consists of a ribbon of cloth, plastic, fiber glass, or metal strip with linear-measurement markings. The first record of a people using a measuring device was the Romans, who used marked strips of leather to perform measurements. Later, tape measures intended for use in tailoring or dressmaking were made from flexible cloth or plastic, but these types of tape measures were mainly used for the measuring of the human's waist line. The basic design on which many modern spring tape measures are built can trace its origins back to an 1868 patent, U.S. Pat. No. 79,965, by a resident of New Haven, Conn., Mr. A. J. Fellows. Fellows' rule, although crude and flimsy, was the first attempt to make a spring tape measure. A spring tape measure has existed since Fellows' patent in 1868, but its usage did not become very popular due to the difficulty in communication from one town to another.

In the early 1900's, carpenters began slowly adopting H. A. Farrand's design as the one more commonly used, which is the design all modern tape measures use today. On Jan. 3, 1922, Hiram A. Farrand received the patent he filed in 1919 for his spring tape measure. Sometime between 1922 and Dec. 1926, Farrand experimented with the help of The Brown Company in Berlin, New Hampshire, and Hiram and William Wentworth Brown began mass-producing the tape measure, which was a product later sold to Stanley Works.

Measuring tapes designed for carpentry or construction often use a stiff, curved metallic ribbon that can remain stiff and straight when extended outwardly, but retracts into a coil for convenient storage. This type of tape measure can provide both inside and outside measurements that are accurate, and the tape measure can extend 25 or even 100 feet. It can also be wound into a relatively small container.

A self-marking tape measure allows the user to accurately measure a distance with a one handed measurement. Some tapes sold in the United States have additional marks in the shape of small black diamonds, which appear every 19.2 inches (48.77 cm). These additional marks are used to indicate equal spacing for joists in a roof construction where five joists or trusses per 8-foot (243.8 cm) length of building material is a standard configuration. Many measuring tapes also have special markings every 16 inches (40.6 cm), which is a standard interval for studs in construction. Three spaces of 16 inches make exactly 4 feet (121.9 cm) which is the commercial width of a sheet of plywood, gyprock or particle board.

Dual scale tapes have been commonly sold in the United States. For example, in some Walmarts there are Hyper Tough brand tapes available in US customary units and Metric units. Tape measures sold in the UK often have dual scales for metric and imperial units. Like the American tape measures described above, they also have markings every 16 in (40.6 cm) and 19.2 in (48.8 cm). And, tape measures sold in Canada often have dual scales for metric and imperial units. All tapes in imperial units have markings every 16 in (40.6 cm), but not at every 19.2 in (48.8 cm).

The design of the modern measuring tape allows for easy measurement of a great length by devices that can be carried in a pocket or toolkit, which also permits one to measure around curves or corners. Measuring tapes have also been made of fiberglass, which does not tear or stretch as easily. Tapes are used in surveying for measuring horizontal, vertical or slope distances, and tapes are issued in various lengths and widths and graduated in variety of ways.

The measuring tapes used for surveying purposes are classified in 4 types according to the material from which they are manufactured: (1) Linen or Cloth Tape made of linen cloth with brass handle at zero end whose length is included in the tape length—these tape measures are very light and handy, but cannot withstand much wear and tear so they should not be used for accurate work, except for taking subsidiary measurements like offsets; (2) Metallic Tape reinforced with copper wires to prevent stretching or twisting of fibers, which are available in many lengths but tapes of 20 m and 30 m are more commonly used; (3) Steel Tape made of steel ribbon varying in width from 6 mm to 16 mm and available in lengths of 1, 2, 10, 30 and 50 meters, but these measuring tapes cannot withstand rough usage and therefore it should be used with great care; and, (4) Invar Tape made of an alloy of steel (64%) and nickel (36%), usually 6 mm wide and lengths of 30 m, 50 m and 100 m., but this measuring tape is more expensive and delicate requiring that it be handled with great care.

With the mass production of the integrated circuit (IC) the tape measure has also entered into the digital age with the digital tape measure. Some of the latest measuring tapes incorporate a digital screen to give measurement readouts in multiple formats. There are also other styles of tape measures that have incorporated lasers and ultrasonic technology to measure the distance of an object with fairly reliable accuracy.

Fluid Containers

First attested in English in the 14th century, the word bottle derives from Old French boteille, which comes from vulgar Latin butticula, itself from late Latin buttis meaning "cask", which is perhaps the latinisation of the Greek Boũis (bouttis), "vessel". Most fluid containers are singular use bottles, which are rigid containers with a neck that is narrower than the body and a mouth. By contrast, a jar has a relatively large mouth or opening, which may be as wide as the overall container. Bottles are often made of glass, clay, plastic, aluminum or other impervious materials, and typically used to store liquids such as water, milk, soft drinks, beer, wine, cooking oil, medicine, shampoo, ink, and chemicals. A device applied in the bottling line to seal the mouth of a bottle is termed an external bottle cap, closure, or internal stopper.

The bottle has developed over millennia of use, with some of the earliest examples appearing in China, Phoenicia, Rome and Crete. Bottles tend to be used only to hold liquids, but bottles can be reused for that purpose many times over as bottles are often recycled and used again and again for that purpose. Glass has all the qualities required for long-term storage of a liquid.

The glass bottle was an important development in the history of wine because, when combined with a high-quality cork stopper, the bottle permitted the wine to be stored over a long period of time—which promoted the long-term aging of wine. Glass bottles eventually gave rise to "château bottling," the practice where an estate's wine is put in a bottle at the source of the wine production, rather than by a merchant further down the supply line. Prior to this practice, wine would be sold by the barrel (or amphora containers) and put into bottles only at the merchant's shop or sold without bottling at the merchant's shop. By not requiring the bottling of wine at the source of wine production, there was a much greater opportunity for abuse, fraud and adulteration of the wine product. Moreover, when merchants sold unbottled wine, they were often confronted with oxidation or contamination hazards, which could lead to unfavorable variations in the taste of the wine. To avoid these problems, most fine wine is bottled at the place of production.

There are many sizes and shapes of bottles, particularly those used for wine. Some of the known shapes: (1) "Bordeaux": This bottle is roughly straight sided with a curved "shoulder" that is useful for catching sediment and is also the easiest to stack. Traditionally used in Bordeaux but now worldwide, this is probably the most common type. (2) "Burgundy": Traditionally used in Burgundy, this has sides that taper down about ⅔ of the height to a short cylindrical section, and does not have a shoulder. (3) "Champagne": Traditionally used for Champagne, it is similar to a Burgundy bottle, but with a wider base and heavier due to the pressurization.

In 1872, British soft drink maker Hiram Codd of Camberwell, London, designed and patented a bottle designed specifically for use in holding carbonated drinks. The Codd-neck bottle was designed and manufactured to enclose a marble and a rubber washer/gasket in the neck. The bottles were filled upside down, and pressure of the gas in the bottle forced the marble against the washer, sealing in the carbonation. The bottle was pinched into a special shape to provide a chamber into which the marble was pushed to open the bottle, which prevented the marble from blocking the neck as the drink was poured. Soon after its introduction, the bottle became extremely popular with the soft drink and brewing industries, mainly in Europe, Asia and Australasia, though some alcohol drinkers disdained the use of the bottle. The Codd-neck design is still used for the Japanese soft drink Ramune and in the Indian drink called Banta.

Plastic bottles are typically used to store liquids such as water, soft drinks, motor oil, cooking oil, medicine, shampoo, milk, and ink. The plastic is strain oriented in the stretch blow molding manufacturing process, and the size of plastic bottles ranges from very small sample bottles to large carboys. The main advantage plastic bottles have over glass bottles is their superior resistance to breakage, in both production and transportation.

A canteen is a drinking water bottle designed to be used by hikers, campers, soldiers and workers in the field. It is usually fitted with a shoulder strap or means for fastening it to a belt, and may be covered with a cloth bag and padding to protect the bottle and insulate the contents. If the padding is soaked with water, evaporative cooling can help keep the contents of the bottle cool, and many canteens also include a nested canteen cup.

Primitive canteens were sometimes made of hollowed-out gourds, such as a calabash, or were bags made of leather. Later, canteens consisted of a glass bottle in a woven basket cover, with the bottle usually closed with a cork stopper. Designs of the mid-1900s were made of metal—tin-plated steel, stainless steel or aluminum—with a screw cap, the cap frequently being secured to the bottle neck with a short chain or strap to prevent loss. These canteens were an improvement over glass bottles, but were subject to developing pinhole leaks if dented, dropped or bumped against jagged rocks.

Contemporary canteen designs are almost exclusively made of one of several types of plastics, especially polyethylene or polycarbonate. They are typically as light as, or lighter than, their metal equivalents and are quite resistant to developing leaks, even when dropped or severely bumped. Hunter-gatherers in the Kalahari use ostrich eggshell as water containers in which they puncture a hole to enable them to be used as canteens. The presence of such eggshells dating from the Howiesons Poort period of the Middle Stone Age at Diepkloof Rock Shelter in South Africa suggests canteens were used by humans as early as 60,000 years ago.

A waterskin is a receptacle used to hold water. Though it may have been used over 5000 years ago by tribal peoples, the first pictures of it are from ancient Assyrians, who used the bladders as floats in 3000 B.C. It was also used by large ancient empires such as Rome before the advent of the canteen. Normally made of a sheep or cow bladder, it retains water naturally and therefore was very useful in desert crossings until the invention of the canteen, and it is still used in some developing nations.

Modern waterskins or bota bags are often made of various plastic or rubber impregnated canvases, or sometimes simply thicker transparent plastics, and are often called waterpouches, water bags, or water bladders. Such modern waterskins offer many features, such as detachable straw-hoses, valves, refill openings of various widths, various closures and handles, styles of covering or cases, and removable cases or carry pouches.

A bota bag or wineskin is a traditional Spanish liquid receptacle that is typically made of leather, and is typically used to carry wine. The zahato [§ahato] is the traditional goatskin bottle of the Basque shepherds. With its narrow nozzle, it is possible to drink "zurrust", i.e. intercepting the jet without touching the end of the bottle with your mouth.

The zahato is made of two pieces of tanned and close-cropped goatskin. Softened, the two pieces are cut out and sewn on their sides, then, the bottle is turned up, seam and hair turned to the inside. After drying, it is inflated, then coated with pitch to make it impermeable. The nozzle is fixed to the skin by a red collar, and the zahato is carried across the shoulder with the red cord which surrounds it along the seam.

Similar to wrist watches, the hip flask began to appear in the form it is recognized today in the 18th century, initially used by members of the gentry. However, less compact versions had been in production for several centuries. Antique hip flasks, particularly those made of silver, are now sought-after collector's items. The hip flask is popular as a commemorative item, often being engraved. The *Modern Drunkard Magazine* describes the engraved flask as the best present one can give. The engravings may be a short quote, the recipient's initials, toasts, dates of memorable occasions, or signs of friendship.

Hip flasks have been made of pewter, silver, or even glass, though most modern flasks are made from stainless steel. Some modern flasks are made of plastic so as to avoid detection by metal detectors. Hip flasks can vary in shape, although they are usually contoured to match the curve of the wearer's hip or thigh for comfort and discretion in a design also known as a kidney flask. Some flasks have "captive tops" which is a small arm that attaches the top to the flask in order to stop it from getting lost when it is taken off.

The above background of this invention describes many variations of beverage holders and fluid containers, none of these fluid containers provide for an effective placement in a measuring tape enclosure or the more efficient use of previously unused space in the measuring container enclosure. The prior are has no indication of anyone incorporating a measuring tape mechanisms with medicinal fluid containers, or vice versa, that anyone has incorporated any type of fluid containers with any type of measuring tape mechanisms.

There is a long-felt, but unfulfilled need, to store fluids in an efficient and effective manner without requiring two separate vessels or components, and there is a long-felt, but unfulfilled need to incorporate a useful fluid vessel in previously unused space in a measuring tape mechanism. There is also a long-felt, but unfulfilled need, to store hydration or medicinal fluids in a more efficient and effective manner on construction or work sites.

SUMMARY OF THE INVENTION

The invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retracting measuring tape with a locking mechanism.

The present invention allows for the simultaneous placement of a fluid container inside previously unused space in a measuring tape housing to store fluids in an efficient and effective manner without requiring two separate vessels or components, to allow for a more efficient and effective incorporation of a useful fluid vessel in previously unused space in a measuring tape mechanism to provide storage of hydration or medicinal fluids in a more efficient and effective manner on construction or work sites. The invention is particularly useful on construction sites and other fabrication areas where a fluid container can be used to prevent dehydration or other serious ailments due to fluid loss on the work day at the construction site. The fluid container can retain a refreshing beverage of the user's choosing and according to that user's preferences, or medicinal liquids to support the health of the user. The goals achieved by the present invention are unrecognized, unrealized and not readily predictable as shown by a survey of the prior art measuring tape and fluid container art.

There is no indication that anyone has incorporated measuring tape mechanisms with medicinal fluid containers, or vice versa, that anyone has incorporated any type of fluid containers with any type of measuring tape mechanisms. The goals of the present invention are not readily apparent from the prior art uses of measuring tapes, or separately, fluid containers; and, the synergies achieved by incorporation of the useful, but unused, space in a measuring tape mechanism, to hold and maintain fluids, particularly medicinal fluids for human consumption, is not readily apparent from the prior art. The goals achieved by the present invention are unrecognized, unrealized and not readily predictable as shown by a survey of the prior art measuring tape and fluid container art.

The main body of the unit has an outer cover housing with an exterior latch to secure and "lock" the measuring tape as extended from tape housing. The housing has a rectangular box shape, but the housing could have other circular or rounded housing shapes. The cap for the fluid container extends outwardly from one side of the house and is positioned in an upward direction. The internal components of the invention include a fluid container with an internal fluid body retention vessel. The container has an external spout with a screw top or other securing top. A tape measure is wound on a spool that resides in the housing and the tape measure extends through a tape slot in the housing to extend outwardly from the housing. When extended out of the tape slot, measurements can be made with the tape measure. The spool of the measuring tape is spring loaded to recoil the tape measure once the latch "locking" mechanism is released. The latch locking mechanism provides functional locking that holds the tape measure in an extended manner while the latch "locking" mechanism is engaged and activated.

The method of making and constructing the invention includes: (1) providing one-half of the tape housing, (2) winding the tape measure onto the measuring tape spool, (3) inserting the measuring tape spool in a wound condition onto the spool axis located inside the housing, (4) extending the end of the tape measure through the tape slot, (5) inserting the latch locking mechanism (with its spring-loaded) into the housing in an un-activated condition, (6) inserting the fluid containing the vessel with the housing with the spout extended outside the housing body, (7) placing the other side of the housing into engagement with the reciprocal part of the housing, (8) securing the two halves of the housing to each other with an adhesive or screws.

There is no indication that anyone has incorporated measuring tape mechanisms with medicinal fluid containers, or vice versa, that anyone has incorporated any type of fluid containers with any type of measuring tape mechanisms. The goals of the present invention are not readily apparent from the prior art uses of measuring tapes, or separately, fluid containers; and, the synergies achieved by incorporation of the useful, but unused, space in a measuring tape mechanism, to hold and maintain fluids, particularly medicinal fluids for human consumption, is not readily apparent from the prior art. The goals achieved by the present invention are unrecognized, unrealized and not readily predictable as shown by a survey of the prior art measuring tape and fluid container art.

DESCRIPTION OF THE FIGURES

The above, and other objects and advantages of the present invention will be understood upon consideration of the following detailed description taken in conjunction with the accompanying drawings, in which like reference characters refer to like parts throughout, and in which.

Figure 1:
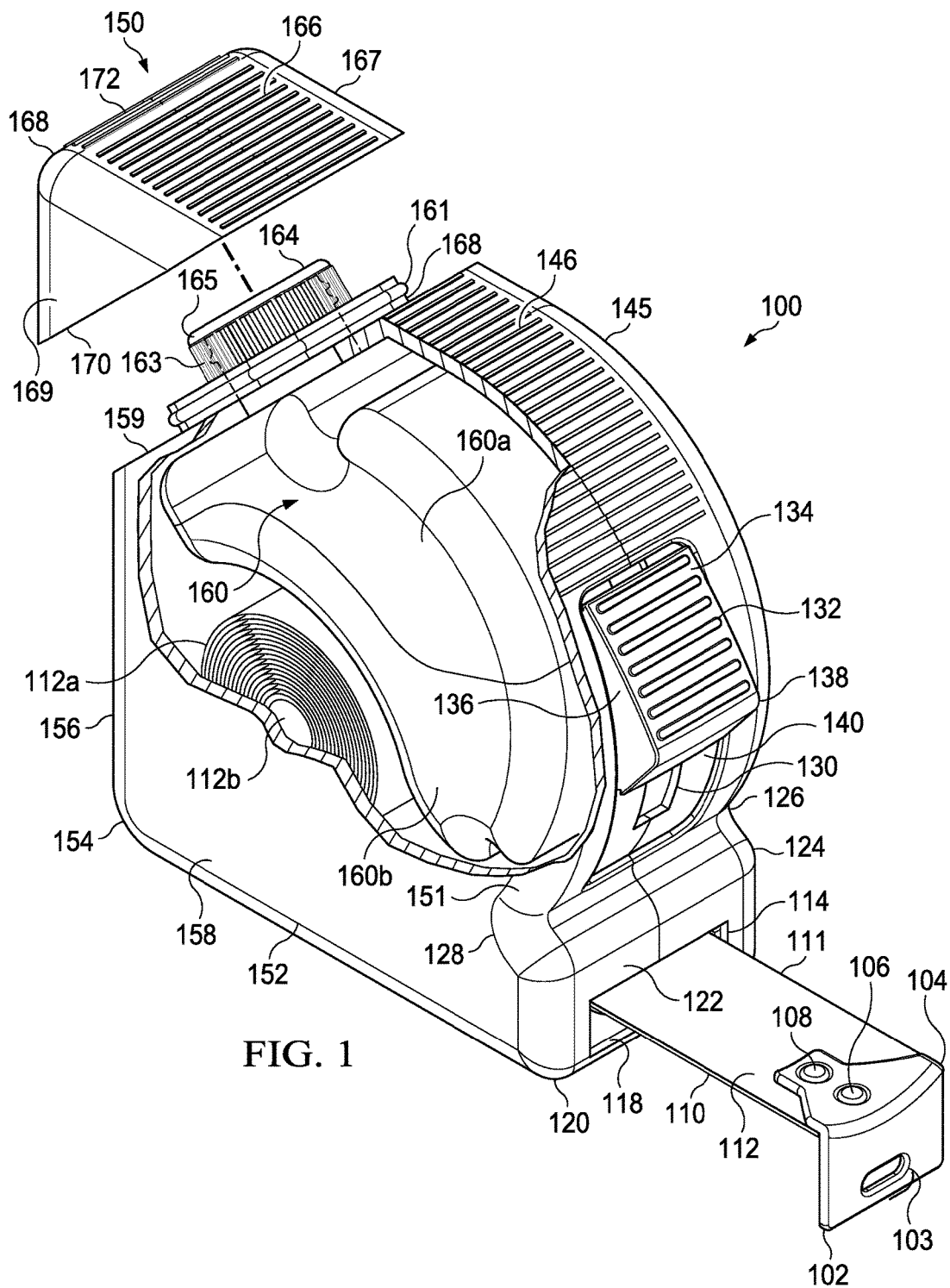
FIG. 1 is a perspective view of the invention with cap detached.

The inventor will use descriptive drawings and text to describe the device and how it functions. While the invention is susceptible to various modifications and alternative forms, specific embodiments thereof have been shown by way of example in the drawings and are herein described in detail below.

DETAILED DESCRIPTION

As shown in FIGS. 1, the invention is a fluid container 160, such as a flask or canteen, that is positioned in previously unused spaces found in the housing of a measuring tape mechanism 100 with a rounded internal wall to maintain a fluid in the container without creating an obstruction of the reel of the measuring tape 112a as it is coiled around the coiling spring 112b. The present invention possesses a fluid container or vessel 160 (which can have different volumes) placed inside the external housing 100 of a measuring tape component (with an opening 163 and cap 164), which is a housing that simultaneously encloses an internal integrated spooled measuring tape 112a with spring-loaded coiling spring 112b having a retractive locking mechanism that holds the tape in place using the external button 138.

The present invention allows for the simultaneous placement of a fluid container 160a inside previously unused space in a measuring tape housing 100 to store fluids in an efficient and effective manner without requiring two separate vessels or components, to allow for a more efficient and effective incorporation of a useful fluid vessel in previously unused space in a measuring tape mechanism where the fluid container has a curved internal wall 160b that prevents obstruction of the measuring tape 112a coiled around the coiling spring 112b, to provide storage of hydration or medicinal fluids in a more efficient and effective manner on construction or work sites.

The invention is particularly useful on construction sites and other fabrication areas where a fluid container can be used to prevent dehydration or other serious ailments due to fluid loss on the work day at the construction site. The fluid container 160 can retain a refreshing beverage of the user's choosing and according to that user's preferences, or it can contain medicinal liquids to support the health of the user. The goals achieved by the present invention are unrecognized, unrealized and not readily predictable as shown by a survey of the prior art measuring tape and fluid container art.

As shown in FIG. 1, the external housing 100 has a top gripping ridges 146 surrounded on both sides by beveled round edges 151 and 145. The enclosure housing 100 has a locking button 138 with gripping ridges 132 and a top portion 134, and has a triangular section 136 for better leverage on the transition of the button in the slot groove 130 and the button receiver slot 40. The locking button 138 secures the measuring tape by locking the coiling spring 112b, which prevents the coiling spring 112b from reeling and coiling back the measuring tape 112 from an extended position outside the measuring tape reel 112a. The housing 100 has a bottom section 120 and a side right side 158 with a beveled right angle 152 intersecting those two sections, a back right corner 154 and a rear right beveled angle 156.

The outer cover housing 100 has an exterior latch 136 to secure and "lock" the measuring tape 112 as extended from tape housing 100. The housing 100 has a rectangular box shape, but the housing could have other circular or rounded housing shapes. The cap 164 for the fluid container 160 extends outwardly from one side of the housing 100 and is positioned in an upward direction with a cover cap 150 being positioned over the cap 164.

The internal components of the invention include a fluid container 160 with an internal fluid body retention vessel such that the fluid container 160 accommodates without interference the operation and coiling of the measuring tape 112a around the coiling spring 112b. The container 160 has an external spout 163 with a screw top 164 or other securing top 164, all covered by a housing cap or cap cover 150. A tape measure 112 is wound in a coiled position 112a on a recoil spring 112b having a spool or axle having that resides in the housing 100, and the tape measure 112 extends through a tape slot 114 in the housing 100 to extend outwardly from the housing 100. When extended out of the tape slot 114, measurements can be made with the tape measure 112. The recoil spring 112b having a spool of the measuring tape 112a coiled around is spring loaded to recoil the tape measure once the latch "locking" mechanism 138 is released. The latch locking mechanism 138 provides functional locking that holds the tape measure 112 and 112a in an extended manner while the latch "locking" mechanism 138 is engaged and activated.

The housing 100 tapers and angles inwardly below the locking button 138 at beveled angles 128 and 126, and housing 100 extends forward at forward extension 124 to accommodate the tape aperture slot 114, which is an aperture slot 114 that allows the measuring tape 112 to extend outwardly in a forward direction from the coiled or reeled 112a internal position around the coiling spring 112b. The measuring tape 112 has a left side edge 111 and a right side edge 110 that extends from the slot 114, which is a slot 114 that has a bottom edge of 118.

The measure tape 112 has an end 104 with a downward clasp 102 having a button aperture 103, rivets 106 and 108 securing the end 104 to the measuring tape 112 and a curved right angle 1-shaped bend between the section having the rivets and the section having the downward clasp.

The cap section 150 has a lower edge 170, a right side 169, a top ridge gripping section 166, a left beveled angle 167 and right beveled angle 168 and rear beveled angle 172. The internal opening 163 is shown with the cap 164 having a beveled edge 165, an internal fluid container 160, an outer lip extension 161 and a fluid container connector 168, positioned on an angled cap plane 159 of the housing 100.

As shown herein, the invention is a fluid container, such as a flask or canteen, positioned in previously unused spaces found in the housing of a measuring tape mechanism such that the fluid container 160 accommodates without interference the operation and coiling of the measuring tape 112a around the coiling spring 112b. The present invention possesses a fluid container or vessel place inside the external housing of a measuring tape component (with an opening and cap), which simultaneously encloses an internal integrated spooled measuring tape with spring-loaded retracting measuring tape with a locking mechanism.

Figure 2:
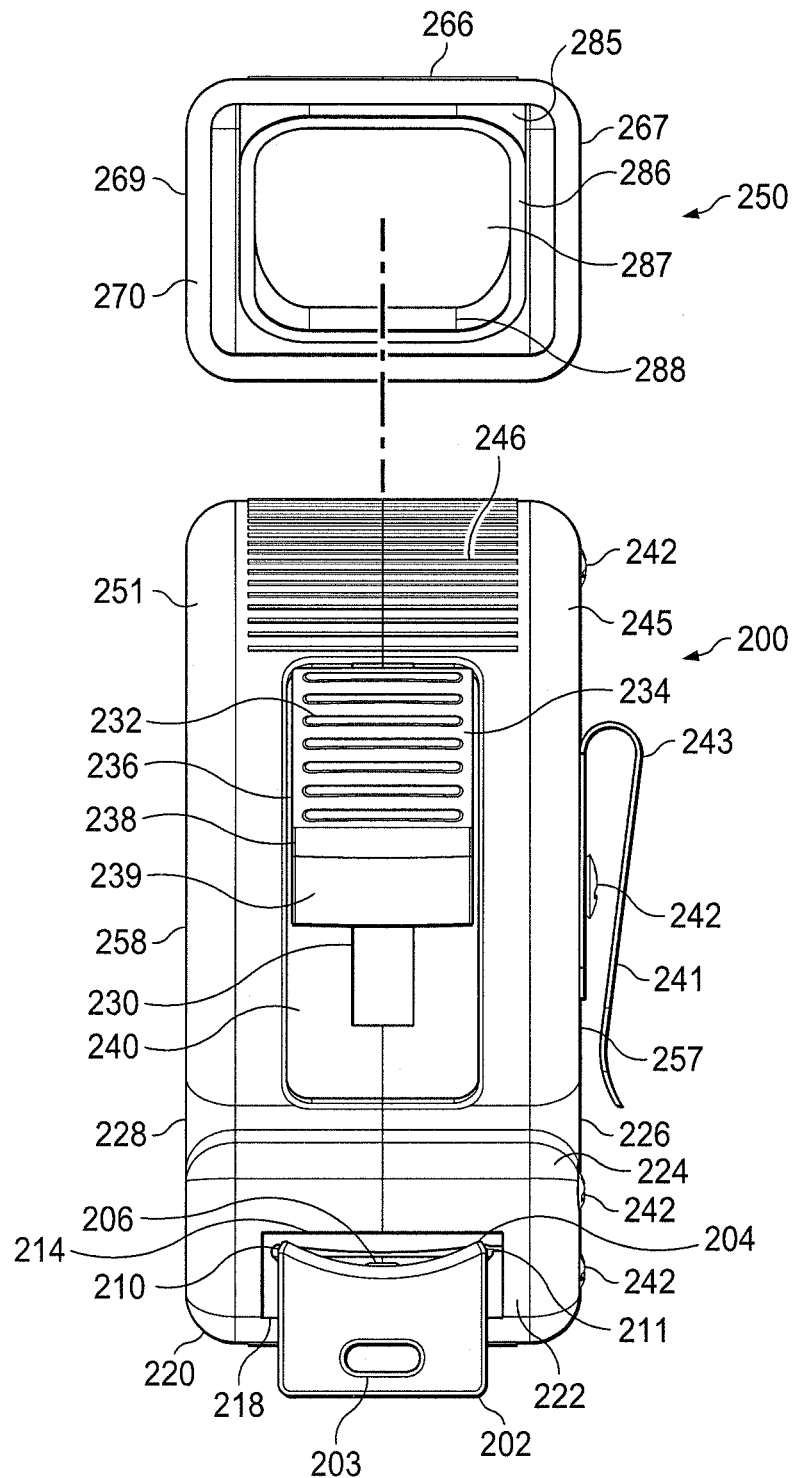
FIG. 2 is a front view of view of the invention with cap detached.

As shown in FIG. 2, the external housing 200 front view is shown having top gripping ridges 246 surrounded on both sides by beveled round edges 251 and 245. The enclosure housing 200 has side screws 242, with one of the side screws 242 securing a belt clasp 243 with a flat belt plate 241 to the housing 200. The housing 200 also has a locking button 238 with gripping ridges 232 and a top portion 234 and a lower portion 239, and has a triangular section 236 for better leverage on the transition of the button in the slot groove 230 and the button receiver slot 240.

The locking button 238 locks the coiled measuring tape (shown by 112a in FIG. 1) by preventing the coiling spring (shown 112b in FIG. 1) from recoiling the measuring tape from its forward extended position. The housing 200 has a bottom section 220, right side 258 and a left side 257. The internal components of the invention include a fluid container (160 shown in FIG. 1) with an internal fluid body retention vessel such that the fluid container 160 accommodates without interference the operation and coiling of the measuring tape 112a around the coiling spring 112b. (Also shown in FIG. 1, the container 160 has an external spout 163 with a screw top 164 or other securing top 164 with a beveled edge 165, all covered by a housing cap or cap cover 150, and the tape measure 112 is wound in a coiled position 112a on a recoil spring 112b having a spool or axle having that resides in the housing 100, and the tape measure 112 extends through a tape slot 214 in the housing 200 to extend outwardly from the housing 200.)

When extended out of the tape slot 214, measurements can be made with the tape measure. The recoil spring 112b shown in FIG. 1 has a recoiled spool of the measuring tape 112a coiled around is spring loaded to recoil the tape measure once the latch "locking" mechanism 238 is released. The latch locking mechanism 238 provides functional locking that holds the tape measure 112 and 112a in an extended manner while the latch "locking" mechanism 238 is engaged and activated.

The method of making and constructing the invention includes: (1) providing one-half (right side 258 or left side 257) of the tape housing 200, (2) winding the tape measure 112a onto the recoil spring 112b having a tape spool, (3) inserting the wound measuring tape 112a in a wound condition onto the recoil spring 112b and locating these elements inside the housing 200, (4) extending the end 204 of the tape measure 112 through the tape slot 214, (5) inserting the latch locking mechanism 238 (with its spring-loaded) into the latching mechanism slots 230 so it can slide along groove 240 on the housing 200 to switch between an activated locking position and an un-activated unlocked position, (6) inserting the fluid vessel 160 into auxiliary unused space inside the housing 200 with the spout 163 extended outside the housing 200, (7) placing a cap 164 over the opening 163 of the fluid container 160; (8) placing the other side (left side 257 or right side 258) of the housing 200 into engagement with the reciprocal part of the housing, (9) securing the two halves of the housing 200 to each other with an adhesive or screws 242. Latches and belt loops 243 can also be attached to the side 257 of the housing 200, and an external cap or housing cap cover 250 can be placed over the cap 164 covering the opening 163 of the fluid vessel 160.

The housing 200 tapers and angles inwardly below the locking button 238 at beveled angles 228 and 226, and housing 200 extends forward at forward extension 224 to accommodate the tape aperture slot 214, which is an aperture slot 214 that allows the measuring tape to extend outwardly in a forward direction from the coiled or reeled 112a internal position shown in FIG. 1 around the coiling spring 112b shown in FIG. 1. The measuring tape has a left side edge 211 and a right side edge 210 that extends from the slot 214, which is a slot 214 that has a bottom edge of 218.

The measure tape has an end 204 with a downward clasp 202 having a button aperture 203, rivets 206 securing the end 204 to the measuring tape and a curved right angle 1-shaped bend between the section having the rivets and the section having the downward clasp.

The cap section 250 has a lower edge 270, a right side 269, a top ridge gripping section 266, and a left side 267. The inside of cap 250 shows a cap aperture wall 288 and 286 surrounding a cap accommodation aperture 287, and surrounded by a cap aperture support 285. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 160 accommodates without interference the operation and coiling of the measuring tape 112a around the coiling spring 112b.

Figure 3:
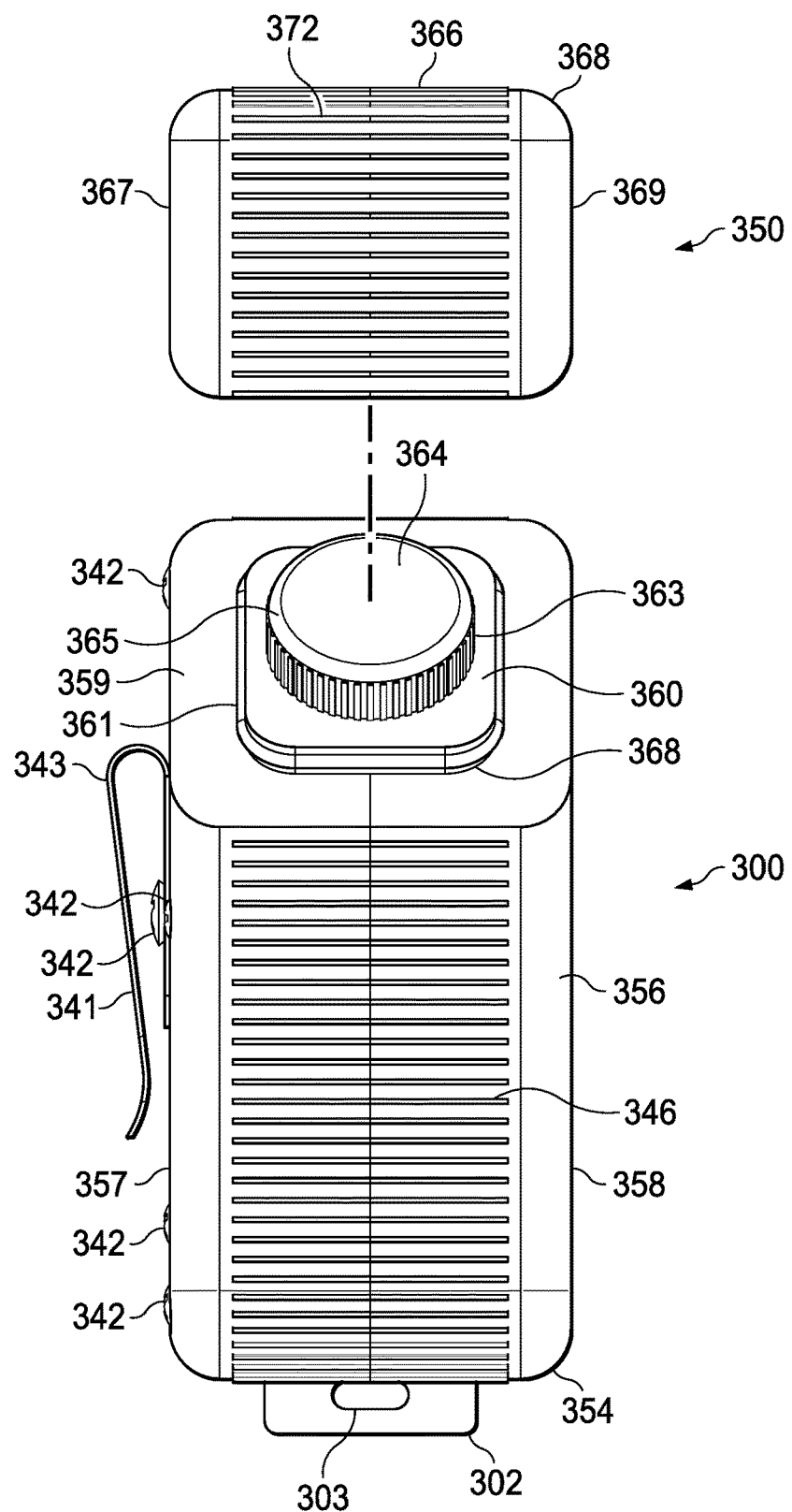
FIG. 3 is a back view of the invention with cap detached.

As shown in FIG. 3, the external housing 300 back or rear view shown having gripping ridges 346 surrounded on both sides by beveled round edges 356. The enclosure housing 300 has side screws 342, with one of the side screws 342 securing a belt clasp 343 with a flat belt plate 341 to the housing 300. The locking button on the opposite side of the rear view of the housing 300 locks the coiled measuring tape (shown by 112a in FIG. 1) by preventing the coiling spring (shown 112b in FIG. 1) from recoiling the measuring tape from its forward extended position.

The housing 300 has a bottom section 354, a right side 358 and a left side 357. The internal components of the invention include a fluid container (160 shown in FIG. 1) with an internal fluid body retention vessel such that the fluid container 360 accomodates without interference the operation and coiling of the measuring tape 112a around the coiling spring 112b. (Also shown in FIG. 1, the container 160 has an external spout 363 with a screw top 364 or other securing top 364 with a beveled edge 365, all covered by a housing cap or cap cover 350, and the tape measure 112 is wound in a coiled position 112a on a recoil spring 112b having a spool or axle having that resides in the housing 300, and the tape measure 112 extends through a tape slot in the housing 300 to extend outwardly from the housing 300.

When extended out of the tape slot, measurements can be made with the tape measure 112. The recoil spring 112b shown in FIG. 1 has a recoiled spool of the measuring tape 112a coiled around is spring loaded to recoil the tape measure once the latch "locking" mechanism 238 is released. The latch locking mechanism provides functional locking that holds the tape measure 112 and 112a in an extended manner while the latch "locking" mechanism is engaged and activated.

The method of making and constructing the invention includes: (1) providing one-half (right side 358 or left side 357) of the tape housing 300, (2) winding the tape measure 112a onto the recoil spring 112b having a tape spool, (3) inserting the wound measuring tape 112a in a wound condition onto the recoil spring 112b and locating these elements inside the housing 300, (4) extending the end 304 of the tape measure 112 through the tape slot 214, (5) inserting the latch locking mechanism 238 (with its spring-loaded) into the latching mechanism slots 230 so it can slide along groove 240 on the housing 300 to switch between an activated locking position and an un-activated unlocked position, (6) inserting the fluid vessel 360 into auxiliary unused space inside the housing 300 with the spout or opening 363 extended outside the housing 300, (7) placing a cap 364 over the opening 363 of the fluid container 360; (8) placing the other side (left side 357 or right side 358) of the housing 300 into engagement with the reciprocal part of the housing, (9) securing the two halves of the housing 300 to each other with an adhesive or screws 342. Latches and belt loops 343 can also be attached to the side 357 of the housing 300, and an external cap or housing cap cover 350 can be placed over the cap 364 covering the opening 363 of the fluid vessel 360.

The housing 300 tapers and angles inwardly below the locking button 338 at beveled angles 328 and 326, and housing 300 extends forward at forward extension 324 to accommodate the tape aperture slot 214, which is an aperture slot 214 that allows the measuring tape to extend outwardly in a forward direction from the coiled or reeled 112a internal position shown in FIG. 1 around the coiling spring 112b shown in FIG. 1. The measuring tape has a left side edge 211 and a right side edge 210 that extends from the slot 214, which is a slot 214 that has a bottom edge of 218.

The measure tape has an end 204 with a downward clasp 302 having a button aperture 303, rivets 206 securing the end 204 to the measuring tape and a curved right angle 1-shaped bend between the section having the rivets and the section having the downward clasp.

The cap section 250 has a rear edge 372, a right side 367, and a top ridge gripping section 366, a left side 367 and a beveled exterior edge 368. The inside of cap 250 has a cap aperture wall 288 and 286 surrounding a cap accommodation aperture 287, and surrounded by a cap aperture support 285. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 360 accommodates without interference the operation and coiling of the measuring tape 112a around the coiling spring 112b.

Figure 4:
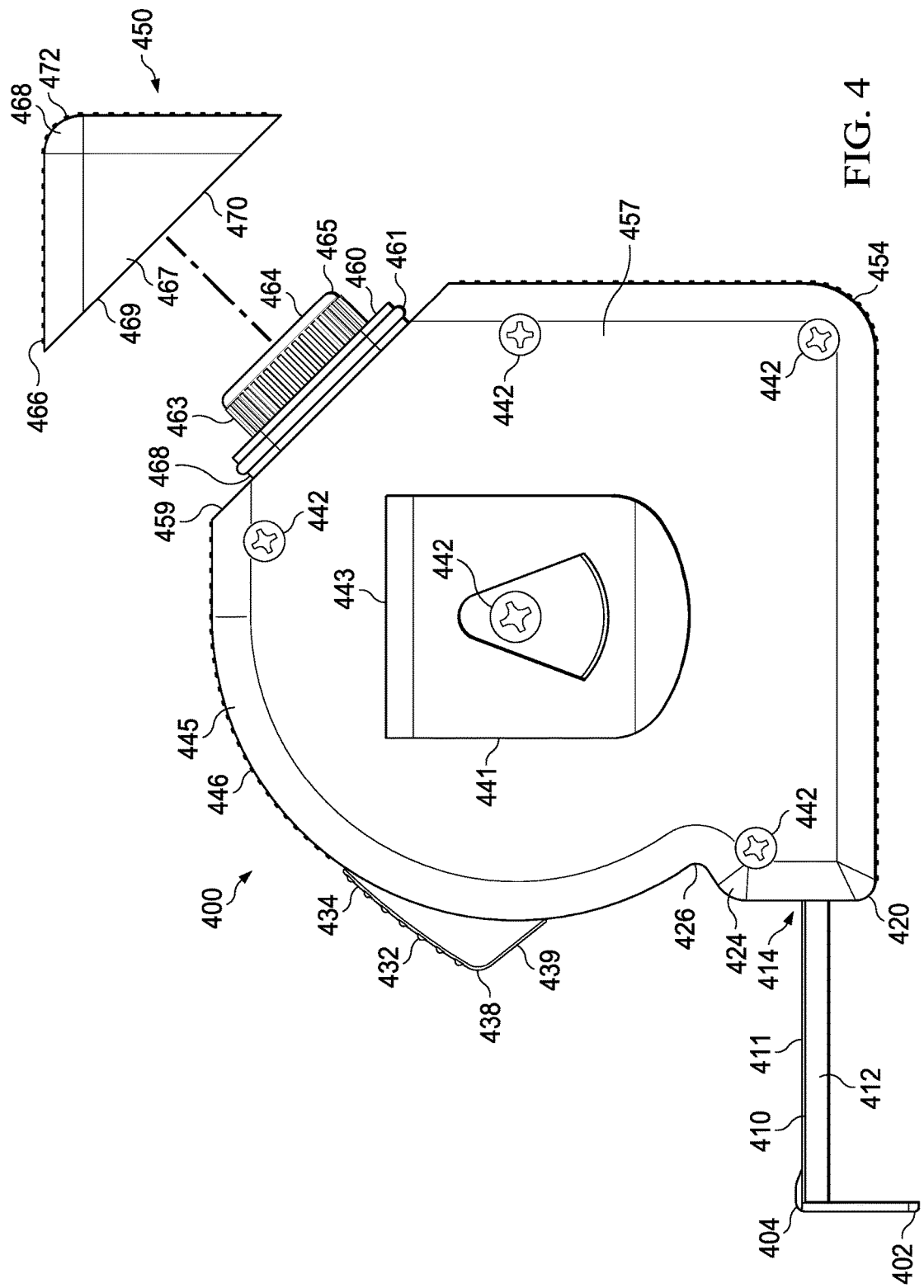
FIG. 4 is a left side view of the invention with cap detached.

As shown in FIG. 4, the external housing 400 left side view is shown having top gripping ridges 446 surrounded on the side by beveled round edge 445. The enclosure housing 400 has side screws 442, with one of the side screws 442 securing a belt clasp 443 with a flat belt plate 441 to the housing 400. The housing 400 also has a locking button 438 with gripping ridges 432 and a top portion 434 and a lower portion 439, and has a triangular section for better leverage on the transition of the button in the slot groove 230 and the button receiver slot 240.

The locking button 438 locks the coiled measuring tape (shown by 112a in FIG. 1) by preventing the coiling spring (shown 112b in FIG. 1) from recoiling the measuring tape from its forward extended position. The housing 400 has a bottom section 420 and a left side 457. The internal components of the invention include a fluid container (160 shown in FIG. 1) with an internal fluid body retention vessel such that the fluid container 460 accommodates without interference the operation and coiling of the measuring tape 112a around the coiling spring 112b. (Also shown in FIG. 1, the container 460 has an external spout 463 with a screw top 464 or other securing top 464 with beveled edge 465, all covered by a housing cap or cap cover 450, and the tape measure 112 is wound in a coiled position 112a on a recoil spring 112b having a spool or axle having that resides in the housing 400, and the tape measure 412 extends through a tape slot 214 in the housing 400 to extend outwardly from the housing 400.)

When extended out of the tape slot 214, measurements can be made with the tape measure. The recoil spring 112b shown in FIG. 1 has a recoiled spool of the measuring tape 112a coiled around is spring loaded to recoil the tape measure once the latch "locking" mechanism 238 is released. The latch locking mechanism 438 provides functional locking that holds the tape measure 112 and 112a in an extended manner while the latch "locking" mechanism 438 is engaged and activated.

The method of making and constructing the invention includes: (1) providing one-half (right side 258 or left side 457) of the tape housing 400, (2) winding the tape measure 112a onto the recoil spring 112b having a tape spool, (3) inserting the wound measuring tape 112a in a wound condition onto the recoil spring 112b and locating these elements inside the housing 400, (4) extending the end 404 of the tape measure 412 through the tape slot 214, (5) inserting the latch locking mechanism 438 (with its spring-loaded) into the latching mechanism slots 430 so it can slide along groove 440 on the housing 400 to switch between an activated locking position and an un-activated unlocked position, (6) inserting the fluid vessel 460 into auxiliary unused space inside the housing 400 with the spout 463 extended outside the housing 400, (7) placing a cap 464 over the opening 463 of the fluid container 460; (8) placing the other side (left side 457 or right side 258) of the housing 400 into engagement with the reciprocal part of the housing, (9) securing the two halves of the housing 400 to each other with an adhesive or screws 442. Latches and belt loops 443 can also be attached to the side 457 of the housing 400, and an external cap or housing cap cover 450 can be placed over the cap 464 covering the opening 463 of the fluid vessel 460.

The housing 400 tapers and angles inwardly below the locking button 438 at beveled angles 426, and housing 400 extends forward at forward extension 424 to accommodate the tape aperture slot 214, which is an aperture slot 214 that allows the measuring tape to extend outwardly in a forward direction from the coiled or reeled 112a internal position shown in FIG. 1 around the coiling spring 112b shown in FIG. 1. The measuring tape has a left side edge 411 and a right side edge 410 that extends from the slot 414, which is a slot 414 that has a bottom edge of 418.

The measure tape has an end 404 with a downward clasp 402 having a button aperture 403, rivets 406 securing the end 404 to the measuring tape and a curved right angle 1-shaped bend between the section having the rivets and the section having the downward clasp.

The cap section 450 has a lower edge 470, a right side 469, a top ridge gripping section 466, and a left side 467. The inside of cap 250 shows a cap aperture wall 288 and 286 surrounding a cap accommodation aperture 287, and surrounded by a cap aperture support 285. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 460 accommodates without interference the operation and coiling of the measuring tape 112a around the coiling spring 112b.

Figure 5:
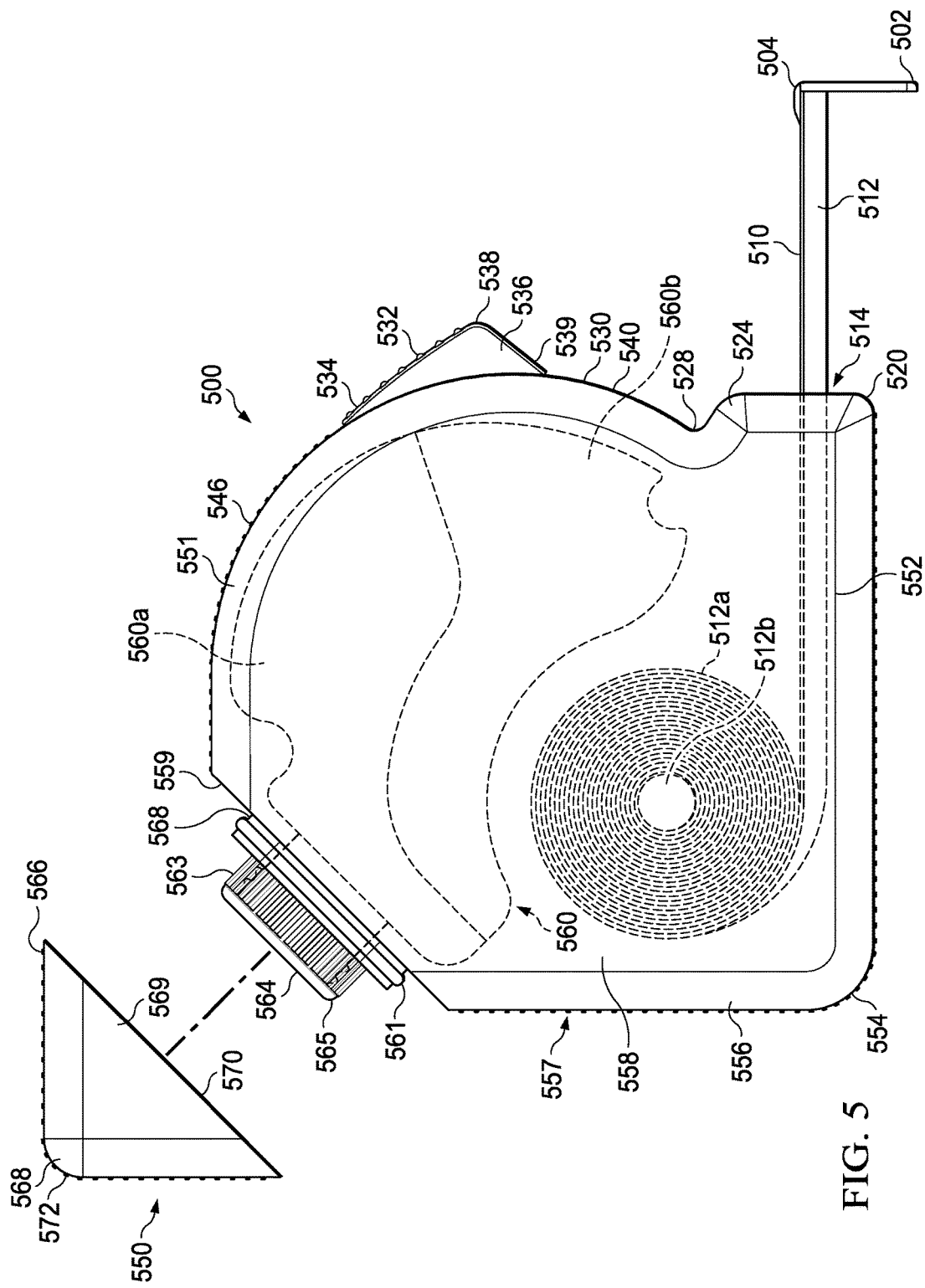
FIG. 5 is a right side view of the invention with cap detached.

As shown in FIG. 5, the external housing 500 right side view is shown having top gripping ridges 546 surrounded on both sides by beveled round edges 551. The enclosure housing 500, with the internal components shown including the fluid container 560 having two fluid sizes, small 560a and larger 560b. The housing 500 also has a locking button 538 with gripping ridges 532 and a top portion 534 and a lower portion 539, and has a triangular section 536 for better leverage on the transition of the button in the slot groove 530 and the button receiver slot 540.

The locking button 538 locks the coiled measuring tape (shown by 512a) by preventing the coiling spring with spool or axle (shown 512b) from recoiling the measuring tape from its forward extended position. The housing 500 has a bottom section 520 and a right side 558. The internal components of the invention include a fluid container (560 with two different sizes, small container 560a and large container 560b) with an internal fluid body retention vessel 560 such that the fluid container 560 accommodates without interference the operation and coiling of the measuring tape 512a around the coiling spring 512b. Small volumes for the fluid container 560a may include 0.1 oz to 1 oz capacity, and larger volumes for the fluid container 560b include 1 oz to 5 oz capacity. The container 560 has an external spout 563 with a screw top 564 or other securing top 564, all covered by a housing cap or cap cover 550, and the tape measure 512 is wound in a coiled position 512a on a recoil spring 512b having a spool or axle having that resides in the housing 500, and the tape measure 512 extends through a tape slot 514 in the housing 500 to extend outwardly from the housing 500.

When extended out of the tape slot 514, measurements can be made with the tape measure. The recoil spring 512b shown in FIG. 5 has a recoiled spool of the measuring tape 512a coiled around is spring loaded to recoil the tape measure once the latch "locking" mechanism 538 is released. The latch locking mechanism 538 provides functional locking that holds the tape measure 512 and 512a in an extended manner while the latch "locking" mechanism 538 is engaged and activated.

The method of making and constructing the invention includes: (1) providing one-half (right side 558) of the tape housing 500, (2) winding the tape measure 512a onto the recoil spring 512b having a tape spool, (3) inserting the wound measuring tape 512a in a wound condition onto the recoil spring 512b and locating these elements inside the housing 500, (4) extending the end 504 of the tape measure 512 through the tape slot 514, (5) inserting the latch locking mechanism 538 (with its spring-loaded) into the latching mechanism slots 530 so it can slide along groove 540 on the housing 500 to switch between an activated locking position and an un-activated unlocked position, (6) inserting the fluid vessel 560 into auxiliary unused space inside the housing 500 with the spout 563 extended outside the housing 500, (7) placing a cap 564 over the opening 563 of the fluid container 560; (8) placing the other side (left side 557 or right side 558) of the housing 500 into engagement with the reciprocal part of the housing, (9) securing the two halves of the housing 500 to each other with an adhesive or screws 542. Latches and belt loops 543 can also be attached to the side 557 of the housing 500, and an external cap or housing cap cover 550 can be placed over the cap 564 covering the opening 563 of the fluid vessel 560.

The housing 500 tapers and angles inwardly below the locking button 538 at beveled angles 528 and 526, and housing 500 extends forward at forward extension 524 to accommodate the tape aperture slot 514, which is an aperture slot 514 that allows the measuring tape to extend outwardly in a forward direction from the coiled or reeled 512a internal position around the coiling spring 512b. The measuring tape has a left side edge 511 and a right side edge 510 that extends from the slot 514, which is a slot 514 that has a bottom edge of 518. The measure tape has an end 504 with a downward clasp 502 having a button aperture, rivets securing the end 504 to the measuring tape and a curved right angle 1-shaped bend between the section having the rivets and the section having the downward clasp.

The cap section 550 has a lower edge 570, a right side 569, a top ridge gripping section 566, and a left side 567. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 560 accommodates without interference the operation and coiling of the measuring tape 512a around the coiling spring 512b.

Figure 6:
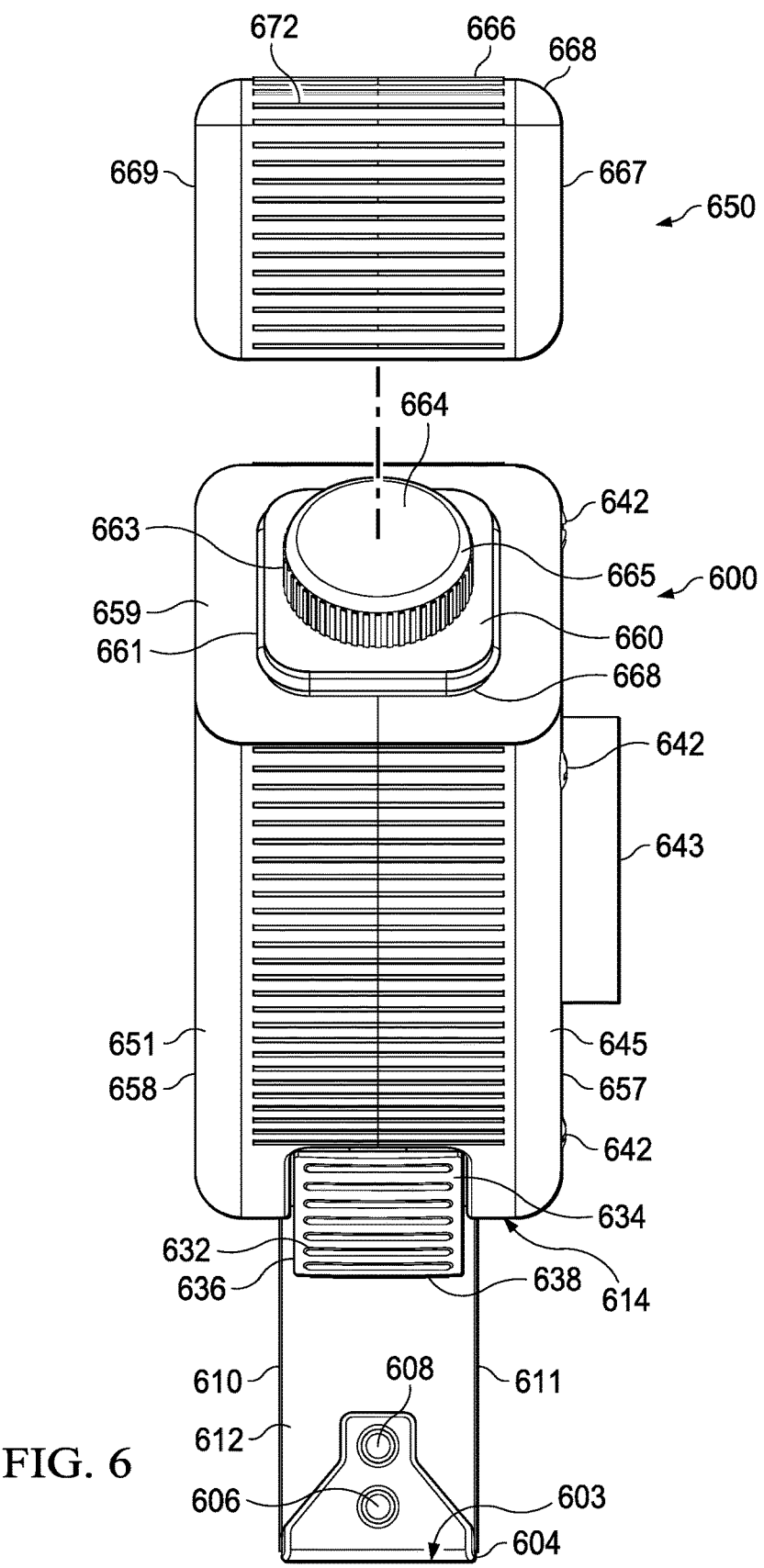
FIG. 6 is a top view of the invention with cap detached.

As shown in FIG. 6, the external housing 600 top view is shown having top gripping ridges 646 surrounded on both sides by beveled round edges 651 and 645. The enclosure housing 600 has side screws 642, with one of the side screws 642 securing a belt clasp 643 with a flat belt plate 641 to the housing 600. The housing 600 also has a locking button 638 with gripping ridges 632 and a top portion 634 and a lower portion 639, and has a triangular section 636 for better leverage on the transition of the button in the slot groove 630 and the button receiver slot 640.

The locking button 638 locks the coiled measuring tape (shown by 112a in FIG. 1) by preventing the coiling spring (shown 112b in FIG. 1) from recoiling the measuring tape from its forward extended position. The housing 600 has a bottom section 620, right side 658 and a left side 657. The internal components of the invention include a fluid container (160 shown in FIG. 1) with an internal fluid body retention vessel such that the fluid container 660 accommodates without interference the operation and coiling of the measuring tape 112a around the coiling spring 112b. Also shown in FIG. 6 and supplemented by FIG. 1, the container 660 has an external spout 663 with a screw top 664 or other securing top 664 with a beveled edge 665, all covered by a housing cap or cap cover 650, and the tape measure 612 is wound in a coiled position 112a on a recoil spring 112b having a spool or axle having that resides in the housing 600, and the tape measure 612 extends through a tape slot 614 in the housing 600 to extend outwardly from the housing 600.

When extended out of the tape slot 614, measurements can be made with the tape measure. The recoil spring 112b shown in FIG. 1 has a recoiled spool of the measuring tape 112a coiled around is spring loaded to recoil the tape measure once the latch "locking" mechanism 638 is released. The latch locking mechanism 638 provides functional locking that holds the tape measure 612 and 112a in an extended manner while the latch "locking" mechanism 638 is engaged and activated.

The method of making and constructing the invention includes: (1) providing one-half (right side 658 or left side 657) of the tape housing 600, (2) winding the tape measure 112*a* onto the recoil spring 112*b* having a tape spool, (3) inserting the wound measuring tape 112*a* in a wound condition onto the recoil spring 112*b* and locating these elements inside the housing 600, (4) extending the end 604 of the tape measure 612 through the tape slot 614, (5) inserting the latch locking mechanism 638 (with its spring-loaded) into the latching mechanism slots 630 so it can slide along groove 640 on the housing 600 to switch between an activated locking position and an un-activated unlocked position, (6) inserting the fluid vessel 660 into auxiliary unused space inside the housing 600 with the spout 663 extended outside the housing 600, (7) placing a cap 664 over the opening 663 of the fluid container 660; (8) placing the other side (left side 657 or right side 658) of the housing 600 into engagement with the reciprocal part of the housing, (9) securing the two halves of the housing 600 to each other with an adhesive or screws 642. Latches and belt loops 643 can also be attached to the side 657 of the housing 600, and an external cap or housing cap cover 650 can be placed over the cap 664 covering the opening 663 of the fluid vessel 660.

The housing 600 tapers and angles inwardly below the locking button 638 at beveled angles 628 and 626, and housing 600 extends forward at forward extension 624 to accommodate the tape aperture slot 614, which is an aperture slot 614 that allows the measuring tape to extend outwardly in a forward direction from the coiled or reeled 112*a* internal position shown in FIG. 1 around the coiling spring 112*b* shown in FIG. 1. The measuring tape has a left side edge 611 and a right side edge 610 that extends from the slot 614, which is a slot 614 that has a bottom edge of 618.

The measure tape has an end 604 with a downward clasp 602 having a button aperture 603, rivets 606 and 608 securing the end 604 to the measuring tape and a curved right angle 1-shaped bend between the section having the rivets and the section having the downward clasp.

The cap section 650 has a lower edge 670, a right side 669, a top ridge gripping section 666, and a left side 667. The inside of cap 650 shows a cap aperture wall 688 and 686 surrounding a cap accommodation aperture 687, and surrounded by a cap aperture support 685. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 660 accommodates without interference the operation and coiling of the measuring tape 112*a* around the coiling spring 112*b* shown in FIG. 1.

Figure 7:
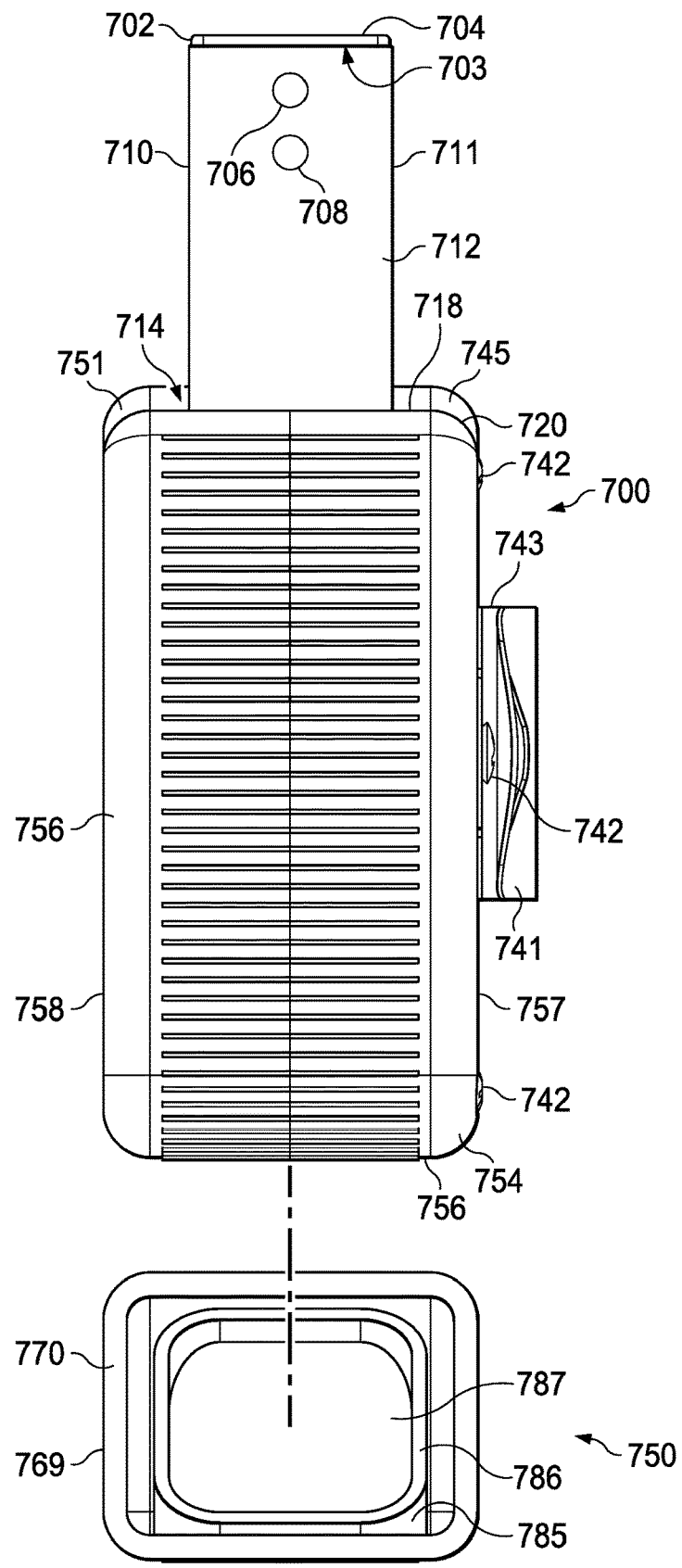
FIG. 7 is a bottom view of the invention with cap detached.

As shown in FIG. 7, the external housing 700 bottom view is shown having top gripping ridges 746 surrounded on both sides by beveled round edges 751 and 745. The enclosure housing 700 has side screws 742, with one of the side screws 742 securing a belt clasp 743 with a flat belt plate 741 to the housing 700. The locking button locks the coiled measuring tape (shown by 112*a* in FIG. 1) by preventing the coiling spring (shown 112*b* in FIG. 1) from recoiling the measuring tape from its forward extended position.

The housing 700 has a bottom section 720, right side 758 and a left side 757. The internal components of the invention include a fluid container (160 shown in FIG. 1) with an internal fluid body retention vessel such that the fluid container accommodates without interference the operation and coiling of the measuring tape 112*a* around the coiling spring 112*b*. Also shown in FIG. 7 and supplemented by FIG. 1, the container has an external spout with a screw top or other securing top with a beveled edge, all covered by a housing cap or cap cover 750, and the tape measure 712 is wound in a coiled position 112*a* on a recoil spring 112*b* having a spool or axle having that resides in the housing 700, and the tape measure 712 extends through a tape slot 714 in the housing 700 to extend outwardly from the housing 700.

When extended out of the tape slot 714, measurements can be made with the tape measure. The recoil spring 112*b* shown in FIG. 1 has a recoiled spool of the measuring tape 112*a* coiled around is spring loaded to recoil the tape measure once the latch "locking" mechanism is released. The latch locking mechanism provides functional locking that holds the tape measure 712 and 112*a* in an extended manner while the latch "locking" mechanism is engaged and activated.

The method of making and constructing the invention includes: (1) providing one-half (right side 758 or left side 757) of the tape housing 700, (2) winding the tape measure 112*a* onto the recoil spring 112*b* having a tape spool, (3) inserting the wound measuring tape 112*a* in a wound condition onto the recoil spring 112*b* and locating these elements inside the housing 700, (4) extending the end 704 of the tape measure 712 through the tape slot 714, (5) inserting the latch locking mechanism (with its spring-loaded) into the latching mechanism slots so it can slide along groove on the housing 700 to switch between an activated locking position and an un-activated unlocked position, (6) inserting the fluid vessel 760 into auxiliary unused space inside the housing 700 with the spout 763 extended outside the housing 700, (7) placing a cap 764 over the opening 763 of the fluid container 760; (8) placing the other side (left side 757 or right side 758) of the housing 700 into engagement with the reciprocal part of the housing, (9) securing the two halves of the housing 700 to each other with an adhesive or screws 742. Latches and belt loops 743 can also be attached to the side 757 of the housing 700, and an external cap or housing cap cover 750 can be placed over the cap 764 covering the opening 763 of the fluid vessel 760.

The housing 700 tapers and angles inwardly below the locking button 738 at beveled angles 728 and 726, and housing 700 extends forward at forward extension 624 to accommodate the tape aperture slot 714, which is an aperture slot 714 that allows the measuring tape to extend outwardly in a forward direction from the coiled or reeled 112*a* internal position shown in FIG. 1 around the coiling spring 112*b* shown in FIG. 1. The measuring tape has a left side edge 711 and a right side edge 710 that extends from the slot 714, which is a slot 714 that has a bottom edge of 718.

The measure tape has an end 704 with a downward clasp 702 having a button aperture 703, rivets 706 and 708 securing the end 704 to the measuring tape and a curved right angle 1-shaped bend between the section having the rivets and the section having the downward clasp.

The cap section 750 has a lower edge 770, a right side 769, a top ridge gripping section 766, and a left side 767. The inside of cap 750 shows a cap aperture wall 788 and 786 surrounding a cap accommodation aperture 787, and surrounded by a cap aperture support 785. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 660 accommodates without interference the operation and coiling of the measuring tape 112a around the coiling spring 112b shown in FIG. 1.

Figure 8:
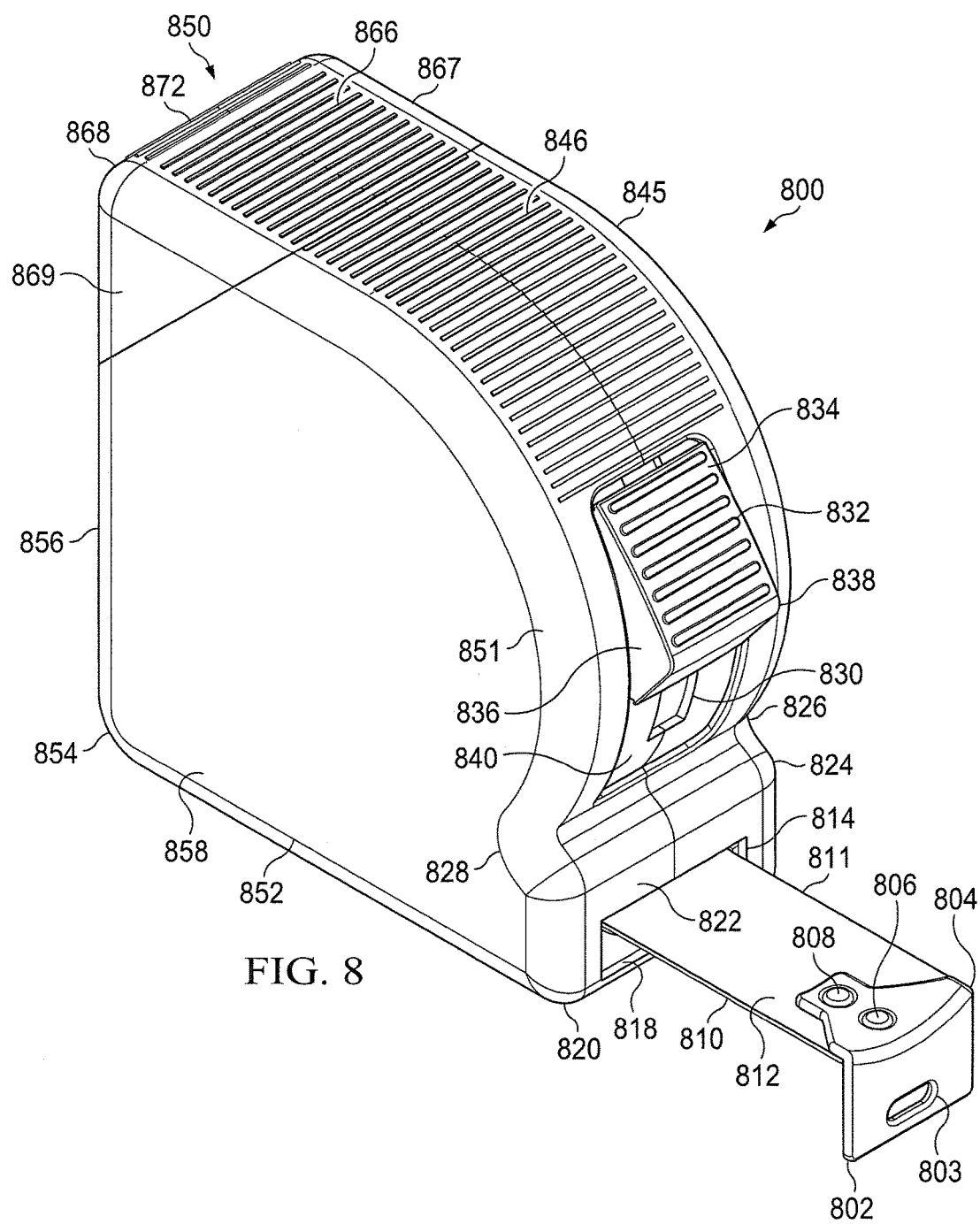
FIG. 8 is a perspective view of the invention with cap attached.

As shown in FIG. 8, the external housing 800 is a perspective view with external cap 850 positioned on housing 800, and is shown having top gripping ridges 846 surrounded on both sides by beveled round edges 851 and 845. The housing 800 also has a locking button 838 with gripping ridges 832 and a top portion 834 and a lower portion 839, and has a triangular section 836 for better leverage on the transition of the button in the slot groove 830 and the button receiver slot 840. The locking button 838 locks the coiled measuring tape (shown by 112a in FIG. 1) by preventing the coiling spring (shown 112b in FIG. 1) from recoiling the measuring tape from its forward extended position.

The housing 800 has a bottom section 820, right side 858 and a left side 857. The internal components of the invention include a fluid container (160 shown in FIG. 1) with an internal fluid body retention vessel such that the fluid container 860 accommodates without interference the operation and coiling of the measuring tape 112a around the coiling spring 112b. Also shown in FIG. 8 and supplemented by FIG. 1, the container 860 has an external spout 863 with a screw top 864 or other securing top 864 with a beveled edge 865, all covered by a housing cap or cap cover 850, and the tape measure 812 is wound in a coiled position 112a on a recoil spring 112b having a spool or axle having that resides in the housing 800, and the tape measure 812 extends through a tape slot 814 in the housing 800 to extend outwardly from the housing 800.

When extended out of the tape slot 814, measurements can be made with the tape measure. The recoil spring 112b shown in FIG. 1 has a recoiled spool of the measuring tape 112a coiled around is spring loaded to recoil the tape measure once the latch "locking" mechanism 838 is released. The latch locking mechanism 838 provides functional locking that holds the tape measure 812 and 112a in an extended manner while the latch "locking" mechanism 838 is engaged and activated.

The method of making and constructing the invention includes: (1) providing one-half (right side 858 or left side 857) of the tape housing 800, (2) winding the tape measure 112a onto the recoil spring 112b having a tape spool, (3) inserting the wound measuring tape 112a in a wound condition onto the recoil spring 112b and locating these elements inside the housing 800, (4) extending the end 804 of the tape measure 812 through the tape slot 814, (5) inserting the latch locking mechanism 838 (with its spring-loaded) into the latching mechanism slots 830 so it can slide along groove 840 on the housing 800 to switch between an activated locking position and an un-activated unlocked position, (6) inserting the fluid vessel 860 into auxiliary unused space inside the housing 800 with the spout 863 extended outside the housing 800, (7) placing a cap 864 over the opening 863 of the fluid container 860; (8) placing the other side (left side 857 or right side 858) of the housing 800 into engagement with the reciprocal part of the housing, (9) securing the two halves of the housing 800 to each other with an adhesive or screws 842. Latches and belt loops 843 can also be attached to the side 857 of the housing 800, and an external cap or housing cap cover 850 can be placed over the cap 864 covering the opening 863 of the fluid vessel 860.

The housing 800 tapers and angles inwardly below the locking button 838 at beveled angles 828 and 826, and housing 800 extends forward at forward extension 824 to accommodate the tape aperture slot 814, which is an aperture slot 814 that allows the measuring tape to extend outwardly in a forward direction from the coiled or reeled 112a internal position shown in FIG. 1 around the coiling spring 112b shown in FIG. 1. The measuring tape has a left side edge 811 and a right side edge 810 that extends from the slot 814, which is a slot 814 that has a bottom edge of 818.

The measure tape has an end 804 with a downward clasp 802 having a button aperture 803, rivets 806 and 808 securing the end 804 to the measuring tape and a curved right angle 1-shaped bend between the section having the rivets and the section having the downward clasp.

The cap section 850 has a lower edge 870, a right side 869, a top ridge gripping section 866, and a left side 867. The inside of cap 850 shows a cap aperture wall 888 and 886 surrounding a cap accommodation aperture 887, and surrounded by a cap aperture support 885. As shown herein, the invention is a fluid container, such as a flask or canteen, positioned in previously unused spaces found in the housing of a measuring tape mechanism. The present invention possesses a fluid container or vessel place inside the external housing of a measuring tape component (with an opening and cap), which simultaneously encloses an internal integrated spooled measuring tape with spring-loaded retroactive locking mechanism such that the fluid container 660 accommodates without interference the operation and coiling of the measuring tape 112a around the coiling spring 112b shown in FIG. 1.

There is no indication that anyone has incorporated measuring tape mechanisms with medicinal fluid containers, or vice versa, that anyone has incorporated any type of fluid containers with any type of measuring tape mechanisms. The goals of the present invention are not readily apparent from the prior art uses of measuring tapes, or separately, fluid containers; and, the synergies achieved by incorporation of the useful, but unused, space in a measuring tape mechanism, to hold and maintain fluids, particularly medicinal fluids for human consumption, is not readily apparent from the prior art. The goals achieved by the present invention are unrecognized, unrealized and not readily predictable as shown by a survey of the prior art measuring tape and fluid container art.

The present invention allows for the simultaneous placement of a fluid container inside previously unused space in a measuring tape housing to store fluids in an efficient and effective manner without requiring two separate vessels or components, to allow for a more efficient and effective incorporation of a useful fluid vessel in previously unused space in a measuring tape mechanism to provide storage of hydration or medicinal fluids in a more efficient and effective manner on construction or work sites. The invention is particularly useful on construction sites and other fabrication areas where a fluid container can be used to prevent dehydration or other serious ailments due to fluid loss on the work day at the construction site. The fluid container can retain a refreshing beverage of the user's choosing and according to that user's preferences, or medicinal liquids to support the health of the user. The goals achieved by the present invention are unrecognized, unrealized and not readily predictable as shown by a survey of the prior art measuring tape and fluid container art.

There is no indication that anyone has incorporated measuring tape mechanisms with medicinal fluid containers, or vice versa, that anyone has incorporated any type of fluid containers with any type of measuring tape mechanisms. The goals of the present invention are not readily apparent from the prior art uses of measuring tapes, or separately, fluid containers; and, the synergies achieved by incorporation of the useful, but unused, space in a measuring tape mechanism, to hold and maintain fluids, particularly medicinal fluids for human consumption, is not readily apparent from the prior art. The goals achieved by the present invention are unrecognized, unrealized and not readily predictable as shown by a survey of the prior art measuring tape and fluid container art.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention; and, in fact, while the invention has been described, disclosed, illustrated and shown in various terms of certain embodiments or modifications which it has presumed in practice, the scope of the invention is not intended to be, nor should it be deemed to be, limited thereby, and such other modifications or embodiments as may be suggested by the teachings herein are particularly reserved, especially as they fall within the breadth and scope of the claims here appended.

I claim:

1. A fluid container, comprising:
    a measuring tape housing having:
        a horizontal bottom surface section having a left edge, a front edge, a rear edge and a right edge;
        a spout surface section having a front edge, a rear edge, a left edge, and a right edge;
        a left side vertical surface section having a top edge, a bottom edge, a front edge, a spout edge, and a rear edge, said bottom edge of said left side vertical surface section being shared with the left edge of the horizontal bottom surface section and said spout edge of said left side vertical surface section being shared with the left edge of said spout surface section;
        a right side vertical surface section having a top edge, a bottom edge, a front edge, a spout edge, and a rear edge, said bottom edge of said right side vertical surface section being shared with the right edge of the horizontal bottom surface section and said spout edge of said right side vertical surface section being shared with the right edge of said spout surface section;
        a front vertical surface section having a top edge, a bottom edge, a left edge, and a right edge, said bottom edge of said front vertical surface section being shared with the front edge of the horizontal bottom surface section, said left edge of said front vertical surface section being shared with the front edge of the left side vertical surface section, said right edge of said front vertical surface section being shared with the front edge of the right side vertical surface section;
        a rear side vertical surface section having a top edge, a bottom edge, a left edge, and a right edge, said bottom edge being of said rear side vertical surface section being shared with the rear edge of the horizontal bottom surface section, said right edge of said rear side vertical surface section being shared with the rear edge of the right side vertical surface section, said left edge of said rear side vertical surface section being shared with the rear edge of the left side vertical surface section, said top edge of said rear side vertical surface section being shared with said rear edge of said spout surface section;
        a top side horizontal surface section having a front edge, a rear edge, a left edge, and a right edge, said front edge of said top side horizontal surface section being shared with the top edge of the front vertical surface section, said rear edge of said top side horizontal surface section being shared with the front edge of said spout surface section, said left edge of said top side horizontal surface section being shared with the top edge of the left side vertical surface section, and right edge of said top side horizontal surface section being shared with the top edge of the right side vertical surface section, and,
        said spout surface section extending on a diagonal plane relative to a horizontal plane defined by the horizontal bottom surface section;
    a measuring tape spooled around a spool axle that rotates around a spool axis, said spool axis being perpendicularly oriented relative to the sides of the measuring tape housing and oriented substantially in parallel relative to the horizontal plane defined by the horizontal bottom section of said measuring tape housing, said measuring tape having a flat surface and an end that extends outside the measuring tape housing from a tape aperture slot located on the front vertical surface section so as to allow the measuring tape to measure a distance,
    a spring-loaded coiling spring that reels back the measuring tape from an extended position outside the measuring tape housing;
    a locking mechanism that holds the measuring tape in place when the end of the measuring tape is in an extended position outside the measuring tape housing,
    a clasp being secured to the end of the measuring tape that extends from the measuring tape housing, said clasp being secured to the measuring tape with one or more rivets and having a curved right angle L-shaped bend between a section having the rivets and a section having a downward edge of the clasp;
    a locking button positioned in a slot groove on the of front vertical surface section of said measuring tape housing and having a set of gripping ridges to provide leverage during the transition of the locking button in said slot groove, said locking button secures the measuring tape by locking the coiling spring to prevent the coiling spring from reeling back the measuring tape from an extended position outside the measuring tape housing;
    a fluid vessel positioned inside the measuring tape housing for retaining a fluid, said fluid vessel having an external spout that extends outwardly from the measuring tape housing from the spout surface section in a substantially perpendicular direction relative to the plane defined by the spout surface section, and said fluid vessel having an internal bottom wall that is upwardly rounded to accommodates the measuring tape when spooled on a spool axle and without obstructing the measuring tape as it is coiled around the coiling spring.

2. The fluid container set forth in claim 1 wherein said fluid container has a volume ranging from 0.1 ounce to 1.0 ounce.

3. The fluid container set forth in claim 1 wherein said fluid container has a volume ranging from 1.0 ounce to 5.0 ounces.

4. The fluid container set forth in claim 1 wherein said measuring tape housing has gripping ridges located on said top side horizontal surface section.

5. The fluid container set forth in claim 1 wherein said external spout of said fluid vessel has a cap that seal the fluid vessel.

6. The fluid container set forth in claim 1 further comprising:
a removable external cap section that covers the external spout of the fluid vessel, said removable external cap section fitting along the spout surface section that extends diagonally from the top surface horizontal section to the back side vertical surface section, said removable external cap section having a back side vertical surface section that corresponds with the back side vertical surface section of the measuring tape housing and a horizontal top surface section that corresponds with the horizontal top surface section of the measuring tape housing.

7. The fluid container set forth in claim 6 wherein the removable external cap section is positioned on the measuring tape housing to substantially conceal the existence of the external spout of the fluid vessel.

8. A fluid container, comprising:
a measuring tape housing having:
a horizontal bottom surface section having a left edge, a front edge, a rear edge and a right edge;
a spout surface section having a front edge, a rear edge, a left edge, and a right edge;
a left side vertical surface section having a top edge, a bottom edge, a front edge, a spout edge, and a rear edge, said bottom edge of said left side vertical surface section being shared with the left edge of the horizontal bottom surface section and said spout edge of said left side vertical surface section being shared with the left edge of said spout surface section;
a right side vertical surface section having a top edge, a bottom edge, a front edge, a spout edge, and a rear edge, said bottom edge of said right side vertical surface section being shared with the right edge of the horizontal bottom surface section and said spout edge of said right side vertical surface section being shared with the right edge of said spout surface section;
a front vertical surface section having a top edge, a bottom edge, a left edge, and a right edge, said bottom edge of said front vertical surface section being shared with the front edge of the horizontal bottom surface section, said left edge of said front vertical surface section being shared with the front edge of the left side vertical surface section, said right edge of said front vertical surface section being shared with the front edge of the right side vertical surface section;
a rear side vertical surface section having a top edge, a bottom edge, a left edge, and a right edge, said bottom edge being of said rear side vertical surface section being shared with the rear edge of the horizontal bottom surface section, said right edge of said rear side vertical surface section being shared with the rear edge of the right side vertical surface section, said left edge of said rear side vertical surface section being shared with the rear edge of the left side vertical surface section, said top edge of said rear side vertical surface section being shared with said rear edge of said spout surface section;
a top side horizontal surface section having a front edge, a rear edge, a left edge, and a right edge, said front edge of said top side horizontal surface section being shared with the top edge of the front vertical surface section, said rear edge of said top side horizontal surface section being shared with the front edge of said spout surface section, said left edge of said top side horizontal surface section being shared with the top edge of the left side vertical surface section, and right edge of said top side horizontal surface section being shared with the top edge of the right side vertical surface section, and,
said spout surface section extending on a diagonal plane relative to a horizontal plane defined by the horizontal bottom surface section;
a measuring tape spooled around a spool axle that rotates around a spool axis, said spool axis being perpendicularly oriented to the sides of the measuring tape housing and oriented substantially in parallel relative to the horizontal plane defined by the horizontal bottom section of said measuring tape housing, said measuring tape having a flat surface and an end that extends outside the measuring tape housing from a tape aperture slot located on the front vertical surface section so as to allow the measuring tape to measure a distance,
a spring-loaded coiling spring that reels and coils back the measuring tape from an extended position outside the measuring tape housing
a fluid vessel positioned inside the measuring tape housing for retaining a fluid, said fluid vessel having an external spout that extends outwardly from the measuring tape housing from the spout surface section in a substantially perpendicular direction relative to the plane defined by the spout surface section, and said fluid vessel having an internal bottom wall that is upwardly rounded to accommodates the measuring tape when spooled on a spool axle and without obstructing the measuring tape as it is coiled around the coiling spring.

9. The fluid container set forth in claim 8 further comprising:
a locking button that activates a locking mechanism to hold the measuring tape in place when the end of the measuring tape is in an extended position outside the measuring tape housing.

10. The fluid container set forth in claim 9 wherein the locking mechanism secures the measuring tape by locking the spring-loaded coiling spring, which prevents the coiling spring from reeling and coiling back the measuring tape from an extended position outside the measuring tape housing.

11. The fluid container set forth in claim 8 wherein the locking button has a set of gripping ridges.

12. The fluid container set forth in claim 8 wherein the locking button is positioned in a slot groove on the front vertical surface section of said measuring tape housing.

13. The fluid container set forth in claim 8 further comprising:
a removable external cap section that covers the external spout of the fluid vessel, said removable external cap section fitting along the spout surface section that extends diagonally from the top surface horizontal section to the back side vertical surface section, said removable external cap section having a back side vertical surface section that corresponds with the back side vertical surface section of the measuring tape housing and a horizontal top surface section that corresponds with the horizontal top surface section of the measuring tape housing.

14. The fluid container set forth in claim 13 wherein the removable external cap section is positioned on the measuring tape housing to substantially conceal the existence of the external spout of the fluid vessel.

15. The fluid container set forth in claim 8 wherein said measuring tape housing has gripping ridges located on said top horizontal surface section.

16. The fluid container set forth in claim 8 wherein said external spout has a fitted cap that seals the fluid container.

17. A fluid container, comprising:
   a measuring tape housing having:
      a horizontal bottom surface section having a left edge, a front edge, a rear edge and a right edge;
      a spout surface section having a front edge, a rear edge, a left edge, and a right edge;
      a left side vertical surface section having a top edge, a bottom edge, a front edge, a spout edge, and a rear edge, said bottom edge of said left side vertical surface section being shared with the left edge of the horizontal bottom surface section and said spout edge of said left side vertical surface section being shared with the left edge of said spout surface section;
      a right side vertical surface section having a top edge, a bottom edge, a front edge, a spout edge, and a rear edge, said bottom edge of said right side vertical surface section being shared with the right edge of the horizontal bottom surface section and said spout edge of said right side vertical surface section being shared with the right edge of said spout surface section;
      a front vertical surface section having a top edge, a bottom edge, a left edge, and a right edge, said bottom edge of said front vertical surface section being shared with the front edge of the horizontal bottom surface section, said left edge of said front vertical surface section being shared with the front edge of the left side vertical surface section, said right edge of said front vertical surface section being shared with the front edge of the right side vertical surface section;
      a rear side vertical surface section having a top edge, a bottom edge, a left edge, and a right edge, said bottom edge being of said rear side vertical surface section being shared with the rear edge of the horizontal bottom surface section, said right edge of said rear side vertical surface section being shared with the rear edge of the right side vertical surface section, said left edge of said rear side vertical surface section being shared with the rear edge of the left side vertical surface section, said top edge of said rear side vertical surface section being shared with said rear edge of said spout surface section;
      a top side horizontal surface section having a front edge, a rear edge, a left edge, and a right edge, said front edge of said top side horizontal surface section being shared with the top edge of the front vertical surface section, said rear edge of said top side horizontal surface section being shared with the front edge of said spout surface section, said left edge of said top side horizontal surface section being shared with the top edge of the left side vertical surface section, and right edge of said top side horizontal surface section being shared with the top edge of the right side vertical surface section, and,
      said spout surface section extending on a diagonal plane relative to a horizontal plane defined by the horizontal bottom surface section;
   a measuring tape spooled around a spool axle that rotates around a spool axis, said spool axis being perpendicularly oriented to the sides of the measuring tape housing and oriented substantially in parallel relative to the horizontal plane defined by the horizontal bottom section of said measuring tape housing, said measuring tape having a flat surface and an end that extends outside the measuring tape housing from a tape aperture slot located on the front vertical surface section so as to allow the measuring tape to measure a distance,
   a fluid vessel positioned inside the measuring tape housing for retaining a fluid, said fluid vessel having an external spout that extends outwardly from the measuring tape housing from the spout surface section in a substantially perpendicular direction relative to the plane defined by the spout surface section, and said fluid vessel having an internal bottom wall that is upwardly rounded to accommodates the measuring tape when spooled on a spool axle and without obstructing the measuring tape as it is coiled around the coiling spring.

18. The fluid container set forth in claim 17 further comprising:
   a locking button that activates a locking mechanism to hold the measuring tape in place when the end of the measuring tape is in an extended position outside the measuring tape housing.

19. The fluid container set forth in claim 18 wherein the locking button has a set of gripping ridges.

20. The fluid container set forth in claim 18 wherein the locking button is positioned in a slot groove located on the front vertical surface section of said measuring tape housing.

21. The fluid container set forth in claim 18 wherein the locking mechanism secures the measuring tape by locking a spring-loaded coiling spring preventing the coiling spring from reeling back the measuring tape from an extended position.

22. The fluid container set forth in claim 17 further comprising:
   a removable external cap section that covers the external spout of the fluid vessel, said removable external cap section fitting along the spout surface section that extends diagonally from the top surface horizontal section to the back side vertical surface section, said removable external cap section having a back side vertical surface section that corresponds with the back side vertical surface section of the measuring tape housing and a horizontal top surface section that corresponds with the horizontal top surface section of the measuring tape housing.

23. The fluid container set forth in claim 17 wherein said measuring tape housing has gripping ridges located on said top side horizontal surface section.

24. The fluid container set forth in claim 17 further comprising:
   a fitted cap that attaches to the spout side surface section of the measuring tape housing to cover the external spout extending from the measuring tape housing.

25. The fluid container set forth in claim 24 wherein the removable external cap section is positioned on the measuring tape housing to substantially conceal the existence of the external spout of the fluid vessel.

26. The fluid container set forth in claim 17 wherein said fluid container has a volume ranging from 0.1 ounce to 5.0 ounces.

27. The fluid container set forth in claim 17 further comprising:
   a clasp located at the end of the measuring tape that extends from the measuring tape housing, said clasp being secured to the measuring tape with one or more rivets and having a curved right angle L-shaped bend between a section having the rivets and a section having a downward edge of the clasp.

* * * * *

UNITED STATES PATENT AND TRADEMARK OFFICE
CERTIFICATE OF CORRECTION

PATENT NO. : 10,352,676 B2
APPLICATION NO. : 15/480225
DATED : July 16, 2019
INVENTOR(S) : Chip Gaines Page 1 of 1

It is certified that error appears in the above-identified patent and that said Letters Patent is hereby corrected as shown below:

In the Claims

Claim 1, Line 35 (Column 19, Line 60), delete "being"
Claim 8, Line 35 (Column 21, Line 55), delete "being"
Claim 8, Line 72 (Column 22, Line 26), after "housing" insert --;--
Claim 17, Line 35 (Column 23, Line 46), delete "being"

Signed and Sealed this
Third Day of September, 2019

Andrei Iancu
*Director of the United States Patent and Trademark Office*